United States Patent

Huang

(10) Patent No.: US 11,070,466 B2
(45) Date of Patent: Jul. 20, 2021

(54) METHOD FOR LINK AGGREGATION AND RELATED DEVICES

(71) Applicant: Guangdong Oppo Mobile Telecommunications Corp., Ltd., Guangdong (CN)

(72) Inventor: Yuan Huang, Guangdong (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 45 days.

(21) Appl. No.: 16/524,992

(22) Filed: Jul. 29, 2019

(65) Prior Publication Data

US 2020/0067825 A1 Feb. 27, 2020

(30) Foreign Application Priority Data

Aug. 23, 2018 (CN) .......................... 201810968301.1

(51) Int. Cl.
*H04H 20/71* (2008.01)
*H04L 12/709* (2013.01)
(Continued)

(52) U.S. Cl.
CPC ........ *H04L 45/245* (2013.01); *H04L 43/0864* (2013.01); *H04L 45/745* (2013.01); *H04W 80/12* (2013.01)

(58) Field of Classification Search
CPC ........ H04W 84/18; H04W 84/12; H04W 4/06
See application file for complete search history.

(56) References Cited

U.S. PATENT DOCUMENTS

2008/0151890 A1 6/2008 Zelig et al.
2014/0092731 A1 4/2014 Gupta
(Continued)

FOREIGN PATENT DOCUMENTS

CN 101212455 B 7/2008
CN 101582902 A 11/2009
(Continued)

OTHER PUBLICATIONS

English translation of the Second Office Action issued in corresponding CN application No. 201810968301.1 dated Jun. 9, 2020.
(Continued)

*Primary Examiner* — Siren Wei (57) ABSTRACT

The present disclosure provides a method for link aggregation and related devices. The method is applied to an electronic device including an application layer, a framework layer, and a kernel layer. The method includes the following. A touch operation on an operation interface is detected via the application layer. A link aggregation function is enabled via the framework layer in response to the touch operation, where the link aggregation function is enabled by establishing a first wireless link and at least one second wireless link. In response to enablement of the link aggregation function, a link selection strategy is determined via the kernel layer, and a mapping relation between data streams and wireless links is established according to the link selection strategy to transmit data stream transmission via on a designated link.

16 Claims, 3 Drawing Sheets

(51) Int. Cl.
*H04W 80/12* (2009.01)
*H04L 12/26* (2006.01)
*H04L 12/741* (2013.01)

(56) References Cited

U.S. PATENT DOCUMENTS

| | | | | |
|---|---|---|---|---|
| 2015/0163715 | A1* | 6/2015 | Das | H04W 36/22 455/436 |
| 2015/0188810 | A1* | 7/2015 | Salkintzis | H04L 45/38 370/328 |
| 2015/0281998 | A1* | 10/2015 | Joly | H04W 48/14 370/235 |
| 2017/0168966 | A1* | 6/2017 | Mishra | G06F 13/4022 |
| 2017/0257309 | A1 | 9/2017 | Appanna | |

FOREIGN PATENT DOCUMENTS

| | | |
|---|---|---|
| CN | 102098740 A | 6/2011 |
| CN | 103547327 A | 1/2014 |
| CN | 103618678 A | 3/2014 |
| CN | 103716252 A | 4/2014 |
| CN | 104639305 A | 5/2015 |
| CN | 106604314 A | 4/2017 |
| CN | 106851682 A | 6/2017 |
| CN | 107295571 A | 10/2017 |
| CN | 108174419 A | 6/2018 |
| CN | 104917678 B | 7/2018 |
| CN | 108337707 A | 7/2018 |
| WO | WO-2017143853 A1 * | 8/2017 ............ H04W 28/10 |

OTHER PUBLICATIONS

International search report issued in corresponding international application No. PCT/CN2019/098206 dated Sep. 27, 2019.
Extended European search report issued in corresponding European application No. 19189671.1 dated Nov. 27, 2019.
English translation of CN OA for CN 201810968301.1 dated Mar. 17, 2020.
India First Examination Report IN Application 201914030776 dated Feb. 1, 2021. (5 pages).

* cited by examiner

METHOD FOR LINK AGGREGATION AND RELATED DEVICES

CROSS-REFERENCE TO RELATED APPLICATION(S)

This application claims priority to Chinese Patent Application Serial No. 201810968301.1, filed on Aug. 23, 2018, the entire disclosures of which are hereby incorporated by reference.

TECHNICAL FIELD

This disclosure relates to the field of electronic technology, and more particularly to a method for link aggregation and related devices.

BACKGROUND

With the popularity of electronic devices such as smart phones, the electronic devices have become indispensable electronic products in daily life. At present, the electronic devices can merely use one wireless link such as a wireless fidelity (Wi-Fi®) or data link to transmit data. If the wireless link has relatively low quality, an efficiency of data transmission can be affected.

SUMMARY

In implementations of the present disclosure provide a method for link aggregation and related devices.

According to a first aspect of the present disclosure, a method for link aggregation is provided. The method is applied to an electronic device including an application layer, a framework layer, and a kernel layer. The method includes the following. A touch operation on an operation interface is detected via the application layer. A link aggregation function is enabled via the framework layer in response to the touch operation, where the link aggregation function is enabled by establishing a first wireless link and at least one second wireless link. In response to enablement of the link aggregation function, a link selection strategy is determined via the kernel layer, and a mapping relation between data streams and wireless links is established according to the link selection strategy to transmit data stream on a designated link.

According to a second aspect of the present disclosure, an electronic device is provided. The electronic device includes an application layer, a framework layer, a kernel layer, a processor, and a memory configured to store one or more programs. The one or more programs, when executed, are operable with the processor to perform the following. A touch operation on an operation interface is detected via the application layer. A link aggregation function is enabled via the framework layer in response to the touch operation, where the link aggregation function is enabled by establishing a first wireless link and at least one second wireless link. In response to enablement of the link aggregation function, a link selection strategy is determined via the kernel layer, and a mapping relation between data streams and wireless links is established according to the link selection strategy to transmit data stream on a designated link.

According to a third aspect of the present disclosure, an electronic device is provided. The electronic device includes a processor and a memory configured to store one or more programs. The one or more programs, when executed, are operable with the processor to perform the following. In response to an operation for enabling a link aggregation function, the link aggregation function is enabled to establish at least two different wireless links. A correspondence between data streams and wireless links is determined, where the wireless links include the at least two different wireless links. A target data stream corresponding to a target data package to be detected is determined. A target wireless link is determined according to the target data stream and the correspondence, where the target wireless link is one of the at least two different wireless links. The target data package is transmitted on the target wireless link.

BRIEF DESCRIPTION OF THE DRAWINGS

To describe the technical solutions of the implementations of the present disclosure or the related art more clearly, the following will give a brief description of accompanying drawings used for describing the implementations of the present disclosure or the related art. Apparently, the accompanying drawings described in the following are merely some implementations of the present disclosure. Those of ordinary skill in the art can also obtain other accompanying drawings based on the accompanying drawings without creative efforts.

DETAILED DESCRIPTION

In order to enable those skilled in the art to better understand technical solutions of the present disclosure, the technical solutions embodied in implementations of the present disclosure will be described in a clear and comprehensive manner in conjunction with the accompanying drawings. It is evident that the implementations described herein are merely some of rather than all the implementations of the present disclosure. Based on the implementations of the present disclosure, all other implementations obtained by those of ordinary skill in the art without creative efforts shall fall within the protection scope of the present disclosure.

The following will describe the technical solutions of the present disclosure in detail.

The terms "first", "second", "third", "forth", and the like used in the specification, the claims, and the accompany drawings of the present disclosure are used to distinguish different objects rather than describe a particular order. The terms "include", "comprise", and "have" as well as variations thereof are intended to cover non-exclusive inclusion. For example, a process, method, system, product, or apparatus including a series of steps or units is not limited to the listed steps or units, on the contrary, it can optionally include other steps or units that are not listed; alternatively, other steps or units inherent to the process, method, product, or device can be included either.

The term "embodiment" or "implementation" referred to herein means that a particular feature, structure, or characteristics described in conjunction with the implementations may be contained in at least one implementation of the present disclosure. The phrase appearing in various places in the specification does not necessarily refer to the same implementation, nor does it refer to an independent or alternative implementation that is mutually exclusive with other implementations. It is expressly and implicitly understood by those skilled in the art that an implementation described herein may be combined with other implementations.

An electronic device involved in the implementations of the present disclosure may include various handheld devices, in-vehicle devices, wearable devices, computing devices that have wireless communication functions, or other processing devices connected to a wireless modem, as well as various forms of user equipment (UE), mobile stations (MS), electronic device devices, and the like.

According to a first aspect of the present disclosure, a method for link aggregation is provided. The method is applied to an electronic device including an application layer, a framework layer, and a kernel layer. The method includes the following. A touch operation on an operation interface is detected via the application layer. A link aggregation function is enabled via the framework layer in response to the touch operation, where the link aggregation function is enabled by establishing a first wireless link and at least one second wireless link. In response to enablement of the link aggregation function, a link selection strategy is determined via the kernel layer, and a mapping relation between data streams and wireless links is established according to the link selection strategy to transmit data stream on a designated link.

In at least one implementation, the link aggregation function is enabled via the framework layer as follows. Link aggregation information is transmitted to the kernel layer via the framework layer, where the link aggregation information is used for enabling the link aggregation function. According to the link aggregation information, the link aggregation function is enabled via the kernel layer.

In at least one implementation, the link aggregation information includes at least one of the following: a score of network quality of the first wireless link, status of a screen of the electronic device, or a white list recording applications allowed to use the link aggregation function.

In at least one implementation, the method further includes the following. The link aggregation function is enabled via the kernel layer in response to at least one of following conditions: the score of the network quality of the first wireless link exceeds a threshold, the status of the screen of the electronic device is a screen-on status, or an application running in a foreground of the electronic device is recorded in the white list.

In at least one implementation, the method further includes the following. According to a transmission rate of the first wireless link and a transmission rate of each of the at least one second wireless link, the link selection strategy is determined via the kernel layer.

In at least one implementation, according to the transmission rate of the first wireless link and the transmission rate of each of the at least one second wireless link, the link selection strategy is determined via the kernel layer as follows. A first peak transmission rate of the first wireless link and a first peak transmission rate of each of the at least one second wireless link at a current time point are obtained via the kernel layer. According to the first peak transmission rate of the first wireless link, a data stream allocation weight for the first wireless link is determined via the kernel layer, and according to the first peak transmission rate of each of the at least one second wireless link, a data stream allocation weight for each of the at least one second wireless link is determined via the kernel layer. According to the data stream allocation weight for the first wireless link and the data stream allocation weight for each of the at least one second wireless link, the link selection strategy is determined via the kernel layer.

In at least one implementation, the first peak transmission rate of the first wireless link and the first peak transmission rate of each of the at least one second wireless link at a current time point are obtained via the kernel layer as follows. A data increment rate of the first wireless link and a data increment rate of each of the at least one second wireless network link at the current time point are obtained via the kernel layer. A second peak transmission rate of the first wireless link and a second peak transmission rate of each of the at least one second wireless link that were determined last time are obtained via the kernel layer. A first round-trip time (RTT) of the first wireless link and a first RTT of each of the at least one second wireless link at the current time point are obtained via the kernel layer. According to the data increment rate of the first wireless link, the second peak transmission rate of the first wireless link, and the first RTT of the first wireless link, the first peak transmission rate of the first wireless link at the current time point is obtained via the kernel layer. According to the data increment rate of each of the at least one second wireless network link, the second peak transmission rate of each of the at least one second wireless link, and the first RTT of each of the at least one second wireless link, the first peak transmission rate of each of the at least one second wireless link at the current time point is obtained via the kernel layer.

In at least one implementation, the data increment rate of the first wireless link and the data increment rate of each of the at least one second wireless network link at the current time point are determined via the kernel layer as follows. A first data amount of the first wireless link and a first data amount of each of the at least one second wireless link at a first time point are obtained via the kernel layer, where the first time point is the current time point. A second data amount of the first wireless link and a second data amount of each of the at least one second wireless link at a second time point are obtained via the kernel layer, where the second time point is earlier than the first time point. According to the first data amount of the first wireless link and the second data amount of the first wireless link, the data increment rate of the first wireless link at the current time point is determined via the kernel layer. According to the first data amount of each of the at least one second wireless link and the second data amount of each of the at least one second wireless link, the data increment rate of each of the at least one second wireless link at the current time point is determined via the kernel layer.

In at least one implementation, the method further includes the following. A link identifier in a target data package to be transmitted is obtained via the kernel layer. A target wireless link corresponding to the link identifier in the target data package is determined via the kernel layer, where the target wireless link is one of the first wireless link and the at least one second wireless link. The target data package is transmitted on the target wireless link via the kernel layer.

In at least one implementation, the method further includes the following. In response to that the target data package is in cache status, a target data stream corresponding to the target data package is determined via the kernel layer. The target wireless link corresponding to the target data stream is determined via the kernel layer. A routing table is queried via the kernel table to add the link identifier of the target wireless link to the target data package.

In at least one implementation, the operation interface is one of the following: a lock interface, a system desktop, a main interface for setting, a network setting interface, or an interface of a target application.

In at least one implementation, the touch operation is one of the following: a touch operation on a link aggregation switch of the operation interface or a touch operation on a designated position of the operation interface.

According to a second aspect of the present disclosure, an electronic device is provided. The electronic device includes an application layer, a framework layer, a kernel layer, a processor, and a memory configured to store one or more programs. The one or more programs, when executed, are operable with the processor to perform the following. A touch operation on an operation interface is detected via the application layer. A link aggregation function is enabled via the framework layer in response to the touch operation, where the link aggregation function is enabled by establishing a first wireless link and at least one second wireless link. In response to enablement of the link aggregation function, a link selection strategy is determined via the kernel layer, and a mapping relation between data streams and wireless links is established according to the link selection strategy to transmit data stream transmission on a designated link.

According to a third aspect of the present disclosure, an electronic device is provided. The electronic device includes a processor and a memory configured to store one or more programs. The one or more programs, when executed, are operable with the processor to perform the following. In response to an operation for enabling a link aggregation function, the link aggregation function is enabled to establish at least two different wireless links. A correspondence between data streams and wireless links is determined, where the wireless links include the at least two different wireless links. A target data stream corresponding to a target data package to be transmitted is determined. A target wireless link is determined according to the target data stream and the correspondence, where the target wireless link is one of the at least two different wireless links. The target data package is transmitted on the target wireless link.

Figure 1:
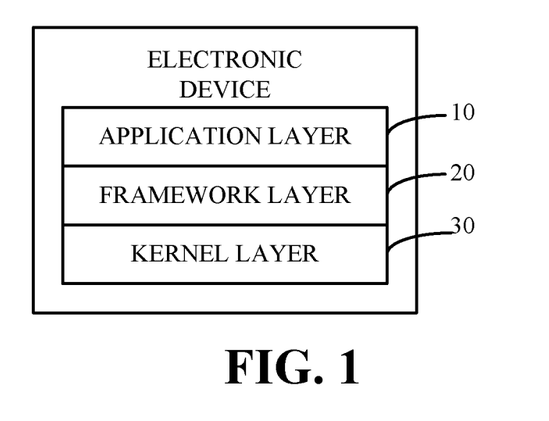
FIG. 1 is a block diagram illustrating an electronic device according to an implementation of the present disclosure.

As illustrated in FIG. 1, FIG. 1 is a block diagram illustrating an electronic device according to an implementation of the present disclosure. The electronic device includes an application layer 10, a framework layer 20, and a kernel layer 30.

The application layer 10 is in charge of providing a user operation interface to detect a touch operation on the operation interface. The operation interface may be for example, a lock interface, a system desktop, a main interface for setting, a network setting interface, an interface of a target application, or the like. The touch operation may be for example, a touch operation performed on a link aggregation switch of the operation interface, a touch operation performed on a designated position of the operation interface, or the like.

The framework layer 20 includes a wireless local area network (WLAN) service, a connectivity service, and Netd. The WLAN service includes the following functions. The first function is determining whether the touch operation detected by the application layer 10 is for enabling a link aggregation function or for disabling the link aggregation function. For example, if the touch operation detected by the application layer 10 is a click operation on the link aggregation switch of the operation interface and the link aggregation switch is currently in off status, the WLAN service determines that the touch operation is for enabling the link aggregation function. The second function is establishing at least one second wireless link after establishment of the first wireless link. The first wireless link is different from the at least one second wireless link. If the at least one second wireless link is embodied as multiple second wireless links, the second wireless links are different from each other. The third function is enabling the link aggregation function. The connectivity service includes the following functions. The first function is updating on/off status of the first wireless link and the at least one second wireless link in real time, and informing the kernel layer 30 of the latest status via the Netd. The second function is informing the kernel layer 30 of current usage of a link aggregation function via the Netd in response to establishment of the first wireless link and the at least one second wireless link. The Netd includes the following functions. The first function is setting an internet protocol (IP) routing rule to realize transmission of a data package containing a link identifier via a wireless link corresponding to the link identifier. The second function is setting an iptables rule to perform source NAT postrouting (SANT) and destination NAT postrouting (DNAT). The third function is performing communication with the kernel layer 30 via netlink.

The kernel layer 30 is in charge of a link selection strategy, establishment of a mapping relation between data streams and wireless links according to the link selection strategy, addition of a link identifier to a data package, transmission of the data package, and so on.

The following will illustrate the implementations of the present disclosure in detail.

Figure 2:
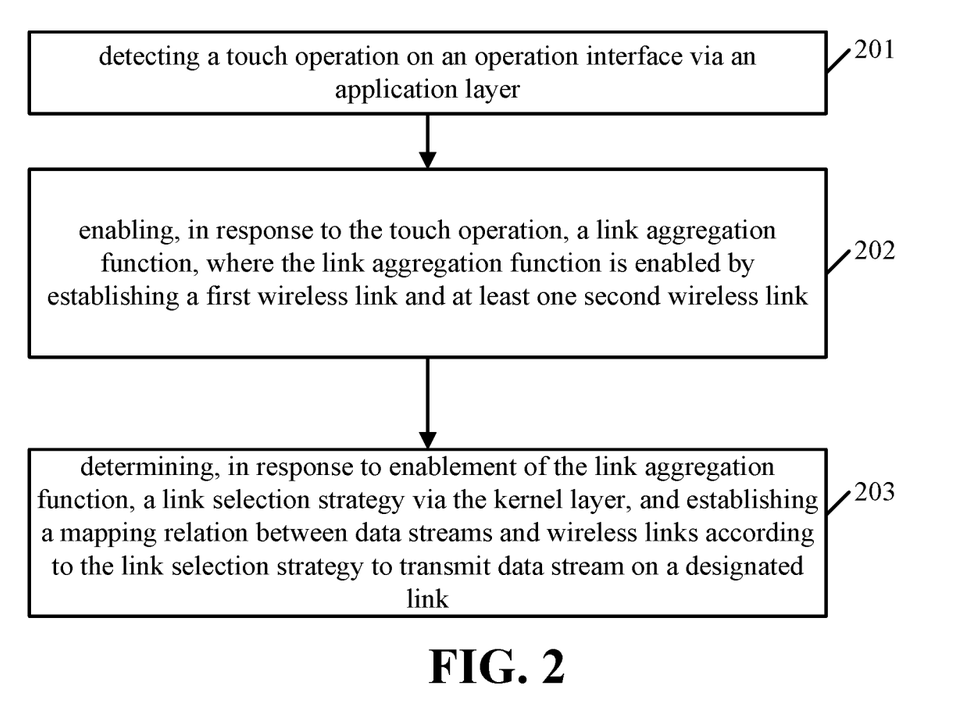
FIG. 2 is a flow chart illustrating a method for link aggregation according to an implementation of the present disclosure.

Referring to FIG. 2, FIG. 2 is a schematic flow chart illustrating a method for link aggregation according to an implementation of the present disclosure. The method is applied to an electronic device including an application layer 10, a framework layer 20, and a kernel layer 30. The method for link aggregation includes the following.

At block 201, the electronic device detects a touch operation on an operation interface via the application layer 10.

In an implementation of the present disclosure, the operation interface may be a lock interface, a system desktop, a main interface for setting, a network setting interface, an interface of a target application, or the like, and the present disclosure is not limited thereto. The target interface may be a shopping application, an instant messaging application, a payment application, an audio play application, a video play application, or the like, and the present disclosure is not limited thereto.

The touch operation may be a touch operation on a link aggregation switch of the operation interface, a touch operation on a designated position of the operation interface, or the like, and the present disclosure is not limited thereto. The touch operation may be a single-click operation, a multi-click operation, a sliding operation, the sliding operation plus the single-click operation, the sliding operation plus the multi-click operation, or the like, and the present disclosure is not limited thereto.

At block 202, when the touch operation is for enabling a link aggregation function, the electronic device enables the link aggregation function via the framework layer 20, where the link aggregation function is enabled by establishing a first wireless link and at least one second wireless link.

For example, a wireless link may be for example, a Wi-Fi link, a data network link, a near field communication (NFC)

link, a Bluetooth link, or the like. The data network link may be a 2-Generation wireless telephone technology (2G) network link, a 3rd-Generation wireless telephone technology (3G) network link, and a long term evolution (LTE) network link, a 5th-Generation wireless telephone technology (5G) network link, or the like.

If the touch operation is a click operation on the link aggregation switch of the operation interface and the link aggregation switch is currently in off status, it is determined that the touch operation is for enabling the link aggregation function. Alternatively, if the touch operation is a set touch operation (for example, an operation that a single-click operation is performed after a sliding operation) on a designated position of the operation interface, it is determined that the touch operation is for enabling the link aggregation function.

The first wireless link is different from the at least one second wireless link. If the at least second wireless link is embodied as multiple second wireless links, the second wireless links are different from each other. If the at least one second wireless link is embodied as one second wireless link, the first wireless link is the Wi-Fi link, and the second wireless link is the data network link. Alternatively, if the at least one second wireless link is embodied as one second wireless link, the first wireless link is the data network link, and the second wireless link is the Wi-Fi link.

At block 203, in response to enablement of the link aggregation function, the electronic device determines a link selection strategy via the kernel layer 30, and establishes a mapping relation between data streams and wireless links according to the link selection strategy to transmit data stream on a designated link.

The link selection strategy is used for allocating data streams established by the electronic device for the first wireless link and the at least one second wireless link. For example, if the first wireless link is the Wi-Fi link, and the at least one second wireless link is one data network link, the link selection strategy is allocating 20% of the data streams for the Wi-Fi link and allocating 80% of the data streams for the data network link.

If the data streams established by the electronic device includes four data streams, the first wireless link is the Wi-Fi link, the at least one second wireless is one data network link, and the link selection strategy is allocating 20% of the data streams for the Wi-Fi link and allocating 80% of the data streams for the data network link, then the electronic device allocates one data stream for the Wi-Fi link, and allocates three data streams for the data network link. It is assumed that the data stream allocated for the Wi-Fi link is a data stream A, and the data stream allocated for the data network link is a data stream B, a data stream C, and a data stream D, the established mapping relation between data streams and wireless links is illustrated in table 1.

TABLE 1

| Data stream | Wireless link |
| --- | --- |
| Data stream A | Wi-Fi link |
| Data stream B, data stream C and data stream D | Data network link |

It can be seen that in the implementation of the present disclosure, when the link aggregation function needs to be enabled, the link aggregation function is enabled via the framework layer 20. The at least one second wireless link is established after establishment of the first wireless link, the link aggregation function is enabled, and in response to establishment of the at least one other wireless link, the kernel layer 30 is informed of usage of the link aggregation function. The link selection strategy is determined via the kernel layer 30, and the mapping relation between data streams and wireless links is established according to the link selection strategy to implement data stream transmission via the designated link. Using multiple wireless links simultaneously to implement data transmission is realized, thereby improving an efficiency of data transmission.

In an implementation of the present disclosure, the electronic device enables the link aggregation function via the framework layer 20 as follows. The electronic device transmits link aggregation information to the kernel layer 30 via the framework layer 20, where the link aggregation information is used for enabling the link aggregation function. In response to receipt of the link aggregation information, according to the link aggregation information, the electronic device enables the link aggregation function via the kernel layer 30, and informs the framework layer 20 of enablement of the link aggregation via the kernel layer 30.

The link aggregation information includes at least one of the following: a score of network quality of the first wireless link, status of a screen of the electronic device, a white list recording applications allowed to use the link aggregation function, and so on. The status of the screen of the electronic device includes screen-off status and screen-on status.

Furthermore, according to the link aggregation information, the electronic device enables the link aggregation function via the kernel layer 30 as follows. When the score of the network quality of the first wireless link exceeds a first threshold, and/or the status of the screen of the electronic device is the screen-on status, and/or an application running in the foreground of the electronic device is recorded in the white list, the electronic device enables the link aggregation function via the kernel layer 30.

It can be seen that, before using the link aggregation function, the link aggregation function is first enabled, so as to avoid unnecessary link aggregation and improve performance of the electronic device.

In an implementation of the present disclosure, the electronic device determines the link selection strategy as follows. According to a transmission rate of the first wireless link and a transmission rate of each of the at least one second wireless link, the electronic device determines the link selection strategy via the kernel layer 30.

In an implementation of the present disclosure, according to the transmission rate of the first wireless link and the transmission rate of each of the at least one second wireless link, the electronic device determines the link selection strategy via the kernel layer 30 as follows. The electronic device obtains a first peak transmission rate of the first wireless link and a first peak transmission rate of each of the at least one second wireless link at a current time point via the kernel layer 30. According to the at least two first peak transmission rates obtained, the electronic device determines a data stream allocation weight for the first wireless link and a data stream allocation weight for each of the at least one second wireless link via the kernel layer 30. The electronic device determines the link selection strategy via the kernel layer 30 according to the at least two data stream allocation weights determined.

The at least two first peak transmission rates are in a one-to-one correspondence with the at least two wireless links, where the at least two wireless links include the first wireless link and at least one second wireless link.

The data stream allocation weight indicates a importance degree when allocating the data streams. Each data stream allocation weight corresponds to one wireless link.

For example, it is assumed that the first wireless link is the Wi-Fi link, the at least one second wireless link is one data network link, the determined data stream allocation weight for the Wi-Fi link is ⅓, and the determined data stream allocation weight for the data network link is ⅔, then the determined link selection strategy is allocating ⅓ of the data streams for the Wi-Fi link, and allocating ⅔ of the data streams for the data network link.

In an implementation of the present disclosure, before the electronic device obtains the first peak transmission rate of the first wireless link and the first peak transmission rate of each of the at least one second wireless link at the current time point via the kernel layer 30, the method further includes the following.

Via the kernel layer 30, the electronic device determines a data increment rate of the first wireless link and a data increment rate of each of the at least one second wireless network link at the current time point, obtains a second peak transmission rate of the first wireless link and a second peak transmission rate of each of the at least one second wireless link that were determined last time, determines a first round-trip time (RTT) of the first wireless link and an RTT of each of the at least one second wireless link at the current time point, and determines the first peak transmission rate of the first wireless link and the first peak transmission rate of each of the at least one second wireless link at the current time point according to the at least two data increment rates determined, the at least two second peak transmission rates obtained, and the at least two first RTTs determined.

The at least two second peak transmission rates are in a one-to-one correspondence with the at least two wireless links, where the at least two wireless links include the first wireless link and the at least one second wireless link. The at least two data increment rates are in a one-to-one correspondence with the at least two wireless links. The at least two first RTTs are in a one-to-one correspondence with the at least two wireless links.

In computer network, the RTT is an important performance index. The RTT referred to herein represents a total delay from beginning of data transmission at a transmitter to receipt of a confirmation instruction at the transmitter, where the confirmation instruction is sent by a receiver immediately after receipt of the data.

In an implementation of the present disclosure, the electronic device determines the data increment rate of the first wireless link and the data increment rate of each of the at least one second wireless link at the current time point via the kernel layer 30 as follows. The electronic device obtains a first data amount of the first wireless link and a first data amount of each of the at least one second wireless link at a first time point via the kernel layer 30, where the first time point is the current time point. The electronic device obtains a second data amount of the first wireless link and a second data amount of each of the at least one second wireless link at a second time point via the kernel layer 30, where the second time point is earlier than the first time point. Thereafter, the electronic device determines the data increment rate of the first wireless link and the data increment rate of each of the at least one second wireless link at the current time point according to the at least two first data amounts obtained and the at least two second data amounts obtained.

A difference value between the first time point and the second time point is set in advance. The difference value may be set by the electronic device by default, or may be set by a user, and the present disclosure is not limited thereto.

The at least two first data amounts are in a one-to-one correspondence with the at least two wireless links, where the at least two wireless links include the first wireless link and the at least one second wireless link. The at least two second data amounts are in a one-to-one correspondence with the at least two wireless links.

In addition, according to the at least two first data amounts obtained and the at least two second data amounts obtained, the electronic device determines the data increment rate of the first wireless link and the data increment rate of each of the at least one second wireless link at the current time point via the kernel layer 30 as follows. The electronic device determines, according to the at least two first data amounts obtained, the at least two second data amounts obtained, and a first calculation formula, the data increment rate of the first wireless link and the data increment rate of each of the at least one wireless link at the current time point via the kernel layer 30.

The first calculation formula is that: data increment rate= (first data amount−second data amount)/(first time point−second time point).

In an implementation of the present disclosure, the electronic device determines the first RTT of the first wireless link and the first RTT of each of the at least one second wireless link at the current time point via the kernel layer 30 as follows. Via the kernel layer 30, the electronic device determines a second RTT for running a transmission control protocol (TCP), obtains a third RTT of the first wireless link and a third RTT of each of the at least one second wireless link that were determined last time, and determines the first RTT of the first wireless link and the first RTT of each of the at least one second wireless link at the current time point according to the second RTT determined and the at least two third RTTs obtained.

The at least two third RTTs are in a one-to-one correspondence with the at least two wireless links, where the at least two wireless links include the first wireless link and at least one second wireless link.

The second RTT refers to transmission duration from beginning of transmission of a TCP packet at a transmitter to receipt of an immediate response for the TCP packet at the transmitter.

The electronic device determines the second RTT for running the TCP via the kernel layer 30 as follows. The electronic device determines the second RTT for running the TCP via a tcp_rtt_estimator ( ) function via the kernel layer 30. The second RTT is an RTT of a first request after three handshakes, such as an RRT of a HTTP get or an RRT of a HTTP post. The three handshakes refer to three processes for confirming TCP connection.

Moreover, according to the second RTT determined and the at least two third RTTs obtained, the electronic device determines the first RTT of the first wireless link and the first RTT of each of the at least one second wireless link at the current time point via the kernel layer 30 as follows. The electronic device determines the first RTT of the first wireless link and the first RTT of each of the at least one second wireless link at the current time point according to the second RTT determined, the at least two third RTTs obtained, and a second calculation formula.

The second calculation formula is that: first RTT=(third RTT+second RTT)/2.

In an implementation of the present disclosure, according to the at least two data increment rates determined, the at least two peak transmission rates obtained, and the at least two first RTTs determined, the electronic device determines the first peak transmission rate of the first wireless link and the first peak transmission rate of each of the at least one second wireless link at the current time point via the kernel layer 30 as follows. The electronic device determines, according to the at least two data increment rates determined, the at least two second peak transmission rates obtained, the at least two first RTTs determined, and a first rule, the first peak transmission rate of the first wireless link and the first peak transmission rate of each of the at least one second wireless link at the current time point via the kernel layer 30. The first rule is determining, in response to that a first RTT of one wireless link is shorter than a predetermined RTT, a larger one in a data increment rate of the one wireless link and a second peak transmission rate of the one wireless link as a first peak transmission rate of the one wireless link, and determining, in response to that a first RTT of one wireless link is longer than or equal to the predetermined RTT, n times a larger one in a data increment rate of the one wireless link and a second peak transmission rate of the one wireless link as a first peak transmission rate of the one wireless link, where n is a positive number smaller than 1.

In an implementation of the disclosure, according to the at least two first peak transmission rates obtained, the electronic device determines the data stream allocation weight for the first wireless link and the data stream allocation weight for each of the at least one second wireless link via the kernel layer 30 as follows. The electronic device determines, according to the at least two first peak transmission rates obtained and a second rule, the data stream allocation weight for the first wireless link and the data stream allocation weight for each of the at least one second wireless link via the kernel layer 30. The second rule is that a data stream allocation weight of one wireless link equals a first peak transmission rate of the one wireless link divided by a sum of first peak transmission rates of all wireless links. A sum of the data stream allocation weights for the at least two wireless links equals 1.

For example, it is assumed that the first wireless link is the Wi-Fi link, the at least one second wireless link is one data network link, the first time point minus the second time point is 1s, a first data amount of the Wi-Fi link is 20 byte, a first data amount of the data network link is 25 byte, a second data amount of the Wi-Fi link is 10 byte, and a second data amount of the data network link is 15 byte, then a data increment rate of the Wi-Fi link at the current time point is 10 byte/s obtained by (20 byte−10 byte)/1 s, and a data increment rate of the data network link at the current time point is 10 byte/s obtained by (25 byte−15 byte)/1 s. In addition, it is assumed that a second peak transmission rate of the Wi-Fi link that was determined last time is 15 byte/s, a second peak transmission rate of the data network link that was determined last time is 10 byte/s, a second RTT is 50 ms, a third RTT of the Wi-Fi link that was determined last time is 40 ms, a third RTT of the data network link that was determined last time is 50 ms, then a first RTT of the Wi-Fi link at the current time point is 45 ms obtained by (50 ms+40 ms)/2, and a first RTT of the data network link at the current time point is 50 ms obtained by (50 ms+50 ms)/2. Furthermore, it is assumed that a predetermined RTT is 50 ms, and n=2, then a first peak transmission rate of the Wi-Fi link is 15 byte/s obtained by max(10 byte/s, 15 byte/s), a first peak transmission rate of the data network link is 5 byte/s obtained by max(10 byte/s, 10 byte/s)/2, a data stream allocation weight for the Wi-Fi link is ¾ obtained by (15 byte/s)/(15 byte/s+5 byte/s), and a data stream allocation weight for the data network link is ¼ obtained by (5 byte/s)/(15 byte/s+5 byte/s).

What needs to be illustrated is that determining the current peak transmission rate of the first wireless link and the current peak transmission rate of each of the at least one second wireless link is performed periodically, for example, every 1 second, every 5 seconds, or every 10 seconds, and the present disclosure is not limited thereto. If not in link aggregation status, determining the current peak transmission rate of the first wireless link and the current peak transmission rate of each of the at least one second wireless link is also performed.

In an implementation of the present disclosure, the method further includes the following after establishment of the mapping relation between data streams and wireless links according to the link selection strategy. When a target data packet to be transmitted is detected, the electronic device obtains a link identifier in the target data package via the kernel layer 30. The electronic device determines a target wireless link corresponding to the link identifier in the target data package via the kernel layer 30, where the target wireless link is one of the first wireless link and the at least one second wireless link. The electronic device transmits the target data package on the target wireless link via the kernel layer 30.

The target data package carries the link identifier. The link identifier indicates a specific wireless link. The link identifier may be presented in various forms. For example, the link identifier may be a mark value. For example, when the mark value is 0x64/0x1ffff, it indicates that the wireless link is the Wi-Fi link. When the mark value is 0x65/0x1ffff, it indicates that the wireless link is an LTE network link, and the present disclosure is not limited thereto.

When the electronic device enables multiple wireless links at the same time, there are multiple routing tables in the electronic device. Each routing table contains a correspondence between link identifiers and wireless network interfaces, that is to say, the electronic device can determine the target wireless link corresponding to the link identifier in the target data package by querying the routing table.

In an implementation of the present disclosure, the method further includes the following before obtaining the link identifier in the target data package to be transmitted when the target data package is detected. When the target data package is in cache status, via the kernel layer 30, the electronic device determines a target data stream corresponding to the target data package, determines the target wireless link corresponding to the target data stream determined, and queries the routing table to add the link identifier of the target wireless link to the target data package.

The data stream includes a set of data packages, where the data packages have the same data type. For example, data packages of video type belong to the same data stream, and data packages of image type belong to the same data stream. The data stream including the target data package can be determined according to the data type of the target data package.

It can be seen that by determining a wireless link for carrying a data package according to a link identifier, a designated link can be used to transmit a data stream, and when transmitting the target data package, a transmission delay can be shortened.

Figure 3:
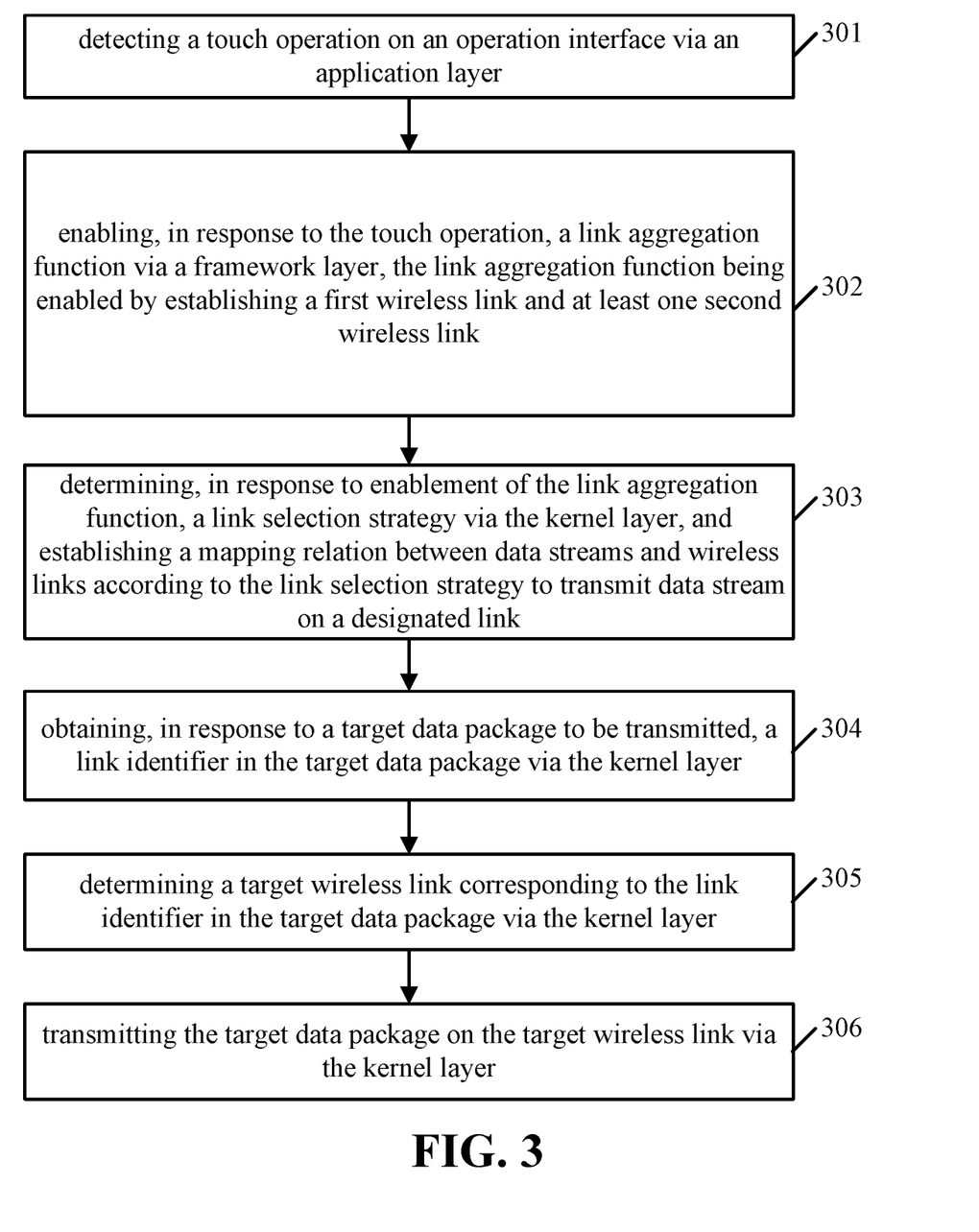
FIG. 3 is a flow chart illustrating a method for link aggregation according to another implementation of the present disclosure.

In consistence with the implementation illustrated in FIG. 2, referring to FIG. 3, FIG. 3 is a schematic flow chart illustrating a method for link aggregation according to an implementation of the present disclosure. The method is applied to an electronic device having an application layer 10, a framework layer 20, and a kernel layer 30. The method for link aggregation includes the following.

At block 301, the electronic device detects a touch operation on an operation interface via the application layer 10.

At block 302, when the touch operation is for enabling a link aggregation function, the electronic device enables the link aggregation function via the framework layer 20, where the link aggregation function is enabled by establishing a first wireless link and at least one second wireless link.

At block 303, the electronic device determines, in response to enablement of the link aggregation function, a link selection strategy via the kernel layer 30, and establishes a mapping relation between data streams and wireless links according to the link selection strategy to transmit data stream transmission on a designated link.

At block 304, when a target data package to be transmitted is detected, the electronic device obtains a link identifier in the target data package via the kernel layer 30.

At block 305, the electronic device determines a target wireless link corresponding to the link identifier in the target data package via the kernel layer 30, where the target wireless link is one of the first wireless link and the at least one second wireless link.

At block 306, the electronic device transmits the target data package on the target wireless link via the kernel layer 30.

What needs to be illustrated is that for detailed realization process of the implementation, reference can be made to the detailed realization process of the above method implementation, and details are not repeated herein.

Figure 4:
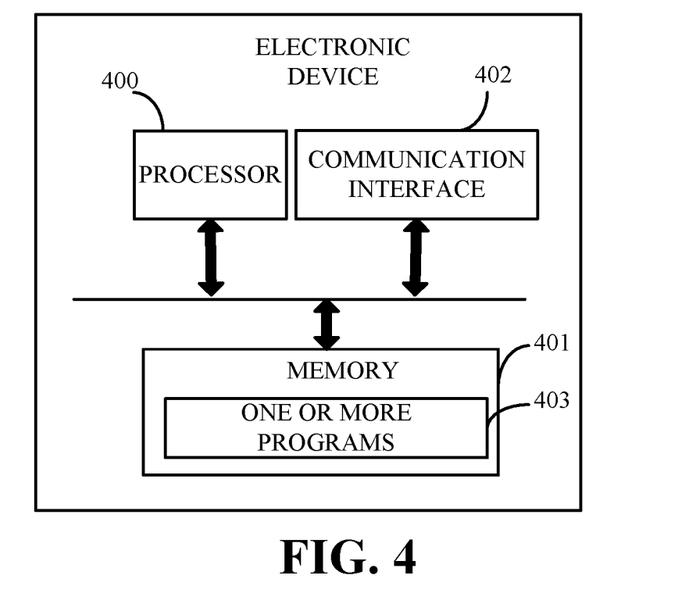
FIG. 4 is a block diagram illustrating an electronic device according to another implementation of the present disclosure.

Consistent with the implementations illustrated in FIG. 2 and FIG. 3, referring to FIG. 4, FIG. 4 is a schematic structural diagram illustrating an electronic device according to an implementation of the present disclosure. The electronic device includes an application layer 10, a frame work layer, and a kernel layer 30. As illustrated in FIG. 4, the electronic device includes a processor 400, a memory 401, a communication interface 402, and one or more programs 403. The one or more programs 403 are stored in the memory 401 and configured to be performed by the processor 400. The one or more programs 403 include instructions operable with the processor 400 to perform the following. A touch operation on an operation interface is detected via the application layer 10. A link aggregation function is enabled via the framework layer 20 when the touch operation is for enabling the link aggregation function, where the link aggregation function is enabled by establishing a first wireless link and at least one second wireless link. In response to enablement of the link aggregation function, a link selection strategy is determined via the kernel layer 30, and a mapping relation between data streams and wireless links is established according to the link selection strategy to transmit data stream on a designated link.

In an implementation of the present disclosure, for enabling the link aggregation function via the framework layer 20, the one or more programs 403 include instructions operable with the processor 400 to perform the following. Link aggregation information is transmitted to the kernel layer 30 via the framework layer 30, where the link aggregation information is used for enabling the link aggregation function. According to the link aggregation information, the link aggregation function is enabled via the kernel layer 30, and the framework layer 20 is informed of enablement of the link aggregation via the kernel layer 30.

In an implementation of the present disclosure, for determining the link selection strategy via the kernel layer 30, the one or more programs 403 include instructions operable with the processor 400 to determine, according to a transmission rate of the first wireless link and a transmission rate of each of the at least one second wireless link, the link selection strategy via the kernel layer 30.

In an implementation of the present disclosure, for determining, according to the transmission rate of the first wireless link and the transmission rate of each of the at least one second wireless link, the link selection strategy via the kernel layer 30, the one or more programs 403 include instructions operable with the processor 400 to obtain a first peak transmission rate of the first wireless link and a first peak transmission rate of each of the at least one second wireless link at a current time point via the kernel layer 30, determine, according to the at least two first peak transmission rates obtained, a data stream allocation weight for the first wireless link and a data stream allocation weight for each of the at least one second wireless link via the kernel layer 30, and determine, according to the at least two data stream allocation weights determined, the link selection strategy via the kernel layer 30.

In an implementation of the present disclosure, for establishing the mapping relation between data streams and wireless links according to the link selection strategy, the one or more programs 403 further include instructions operable with the processor 400 to perform the following. When a target data package to be transmitted is detected, a link identifier in the target data package is obtained via the kernel layer 30. A target wireless link corresponding to the link identifier in the target data package is determined via the kernel layer 30, where the target wireless link is one of the first wireless link and one of the at least one second wireless link. The target data package is transmitted on the target wireless link via the kernel layer 30.

In an implementation of the present disclosure, before obtaining, in response to that the target data package to be transmitted is detected, the link identifier in the target data package via the kernel layer 30, the one or more programs 403 further include instructions operable with the processor 400 to determine a target data stream corresponding to the target data package via the kernel layer 30 when the target data package is in cache status, determine the target wireless link corresponding to the target data stream via the kernel layer 30, and query a routing table via the kernel layer 30 to add the link identifier of the target wireless link to the target data package.

In an implementation of the present disclosure, the operation interface is one of the following: a lock interface, a system desktop interface, a main interface for setting, a network setting interface, or an interface of a target application.

What needs to be illustrated is that for detailed realization process of the present implementation, reference can be made to the detailed realization process of the above method implementation, and details are not repeated herein.

The foregoing implementations mainly introduces the solution of the implementation of the present disclosure from the perspective of the method process. It can be understood that the electronic device includes corresponding hardware structures and/or software modules for performing the respective functions to implement the above functions. Those skilled in the art readily appreciate that the present disclosure can be implemented in hardware or a combination of hardware and computer software according to the elements and algorithms of the various examples described in the implementations disclosed herein. Whether a function is implemented in hardware or a manner of driving hardware by computer software depends on the specific application and design constraints of the solution. A person skilled in the art can use different methods for each particular application to implement the described functions, but such realization should not be considered to be beyond the scope of the present disclosure.

In the implementations of the present disclosure, the electronic device can be divided into functional units according to the method implementations. For example, the electronic device can be divided into functional units according to various functions, or two or more functions may be integrated into one processing unit. The integrated unit can be implemented in the form of hardware or in the form of a software functional unit. What needs to be illustrated is that the division of the units in the implementation of the present disclosure is illustrative and only a logical function division, and there can be other division manners in actual implementations.

Figure 5:
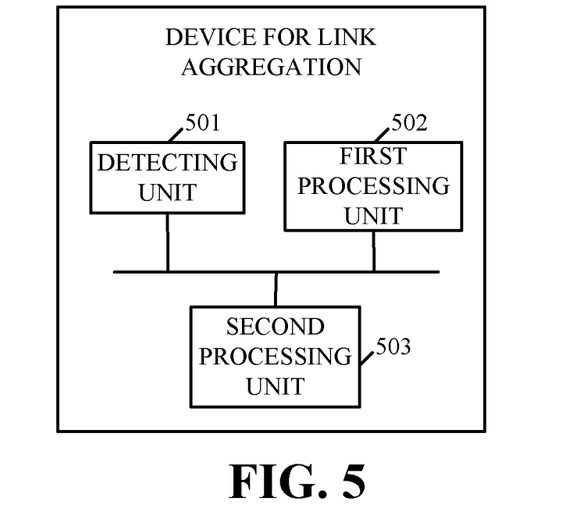
FIG. 5 is a block diagram illustrating a device for link aggregation according to an implementation of the present disclosure.

The following is a device implementation of the present disclosure. The device implementation of the present disclosure is used for executing the methods realized by the method implementations of the present disclosure. Referring to FIG. 5, FIG. 5 illustrates a device for link aggregation according to an implementation of the present disclosure. The device for link aggregation is applied to an electronic device having an application layer 10, a framework layer 20, and a kernel layer 30. The device for link aggregation includes a detecting unit 501, a first processing unit 502, and a second processing unit 503.

The detecting unit 501 is configured to detect a touch operation on an operation interface via the application layer 10.

The first processing unit 502 is configured to enable a link aggregation function via the framework layer 20 when the touch operation is for enabling the link aggregation function, where the link aggregation function is enabled by establishing a first wireless link and at least one second wireless link.

The second processing unit 503 is configured to determine, in response to enablement of the link aggregation function a link selection strategy via the kernel layer 30, and establish a mapping relation between data streams and wireless links according to the link selection strategy to realize data stream transmission via a designated link.

In an implementation of the present disclosure, the first processing unit 502 configured to enable the link aggregation function via the framework layer 20 is configured to perform the following. Link aggregation information is transmitted to the kernel layer 30 via the framework layer 20, where the link aggregation information is used for enabling the link aggregation function. The link aggregation function is enabled via the kernel layer 30 according to the link aggregation information.

In an implementation of the present disclosure, the second processing unit 503 configured to determine the link selection strategy via the kernel layer 30 is configured to determine, according to a first transmission rate of the first wireless link and a first transmission rate of each of the at least one second wireless link, the link selection strategy via the kernel layer 30.

In an implementation of the present disclosure, the second processing unit 503 configured to determine, via the kernel layer 30, the link selection strategy according to the transmission rate of the first wireless link and the transmission rate of each of the at least one second wireless link is configured to obtain a first peak transmission rate of the first wireless link and a first peak transmission rate of each of the at least one second wireless link at a current time point via the kernel layer 30, determine, according to the at least two first peak transmission rates obtained, a data stream allocation weight for the first wireless link and a data stream allocation weight for each of the at least one second wireless link via the kernel layer 30, and determine, according to the at least two data stream allocation weights determined, the link selection strategy via the kernel layer 30.

In an implementation of the present disclosure, the device further includes a third processing unit (not illustrated) configured to perform the following. When a target data package to be transmitted is detected, a link identifier in the target data package is obtained via the kernel layer 30. A target wireless link corresponding to the link identifier in the target data package is determined via the kernel layer 30, where the target wireless link is one of the first wireless link and the at least one second wireless link. The target data package is transmitted on the target wireless link via the kernel layer 30.

In an implementation of the present disclosure, the device further includes a fourth processing unit (not illustrated) configured to determine a target data stream corresponding to the target data package via the kernel layer 30 when the target data package is in cache status, determine the target wireless link corresponding to the target data stream via the kernel layer 30, and query a routing table via the kernel layer 30 to add the link identifier of the target wireless link to the target data package.

In an implementation of the present disclosure, the operation interface is one of the following: a lock interface, a system desktop interface, a main interface for setting, a network setting interface, or an interface of a target application.

What needs to be illustrated is that the detecting unit 501, the first processing unit 502, the second processing unit 503, the third processing unit, and the fourth processing unit can be implemented in the form of a processing unit.

Implementations of the present disclosure also provide a computer storage medium. The computer storage medium stores computer programs for electronic data interchange. The computer programs are operable with a computer to accomplish all or part of the operations of any of the methods described in the above-described method implementations. The computer may be an electronic device.

Implementations of the present disclosure also provide a computer program product. The computer program product includes a non-transitory computer-readable storage medium storing computer programs. The computer programs are operable with a computer to perform all or part of the operations of any of the methods described in the above method implementations. The computer program product may be a software installation package. The computer may be an electronic device.

It is to be noted that, for the sake of simplicity, the foregoing method implementations are described as a series of action combinations, however, it will be appreciated by those skilled in the art that the present disclosure is not limited by the sequence of actions described. According to the present disclosure, certain steps or operations may be performed in other order or simultaneously. Besides, it will be appreciated by those skilled in the art that the implementations described in the specification are exemplary implementations and the actions and modules involved are not necessarily essential to the present disclosure.

In the foregoing implementations, the description of each implementation has its own emphasis. For the parts not described in detail in one implementation, reference may be made to related descriptions in other implementations.

In the implementations of the disclosure, it is to be understood that, the apparatus disclosed in implementations provided herein may be implemented in other manners. For example, the device/apparatus implementations described above are merely illustrative; for instance, the division of the units is only a logical function division and there can be other division manners in actual implementations, for example, multiple units or components may be combined or may be integrated into another system, or some features may be ignored or skipped. In addition, coupling, direct coupling, or communication connection illustrated or discussed may be indirect coupling or communication among devices or units via some interfaces, and may be electrical connection, or other forms of connection.

The units described as separate components may or may not be physically separated. The components illustrated as units may or may not be physical units, that is, they may be in the same place or may be distributed to multiple network elements. All or part of the units may be selected according to actual needs to achieve the purpose of the technical solutions of the implementations.

In addition, the functional units in various implementations of the present disclosure may be integrated into one processing unit, or each unit may be physically present, or two or more units may be integrated into one unit. The above-mentioned integrated unit can be implemented in the form of hardware or a software function unit.

The integrated unit may be stored in a computer-readable memory when it is implemented in the form of a software functional unit and is sold or used as a separate product. Based on such understanding, the technical solutions of the present disclosure essentially, or the part of the technical solutions that contributes to the related art, or all or part of the technical solutions, may be embodied in the form of a software product which is stored in a memory and includes instructions for causing a computer device (which may be a personal computer, a server, or a network device and so on) to perform all or part of the operations described in the various implementations of the present disclosure. The memory includes various medium capable of storing program codes, such as a universal serial bus (USB) flash disk, a read-only memory (ROM), a random access memory (RAM), a removable hard disk, Disk, compact disc (CD), or the like.

It will be understood by those of ordinary skill in the art that all or a part of the various methods of the implementations described above may be accomplished by means of a program to instruct associated hardware. The program may be stored in a computer-readable memory, which may include a flash memory, an ROM, an RAM, a disk or a compact disc (CD), and so on.

The foregoing illustrates the implementations of the present disclosure in detail. The principle and implementations of the present disclosure are illustrated by specific examples. The illustration of the above implementations are merely used to facilitate understanding of the methods and core concept of the present disclosure. For a person skilled in the art, according to the concept of the present disclosure, specific implementations and application ranges may be both changed. Based on the above, the present disclosure shall not be understood to be limited to the specification.

What is claimed is:

1. A method for link aggregation being applied to an electronic device comprising an application layer, a framework layer, and a kernel layer, the method comprising:
    detecting a touch operation on an operation interface via the application layer;
    enabling, in response to the touch operation, a link aggregation function via the framework layer, the link aggregation function being enabled by establishing a first wireless link and at least one second wireless link;
    determining, in response to enablement of the link aggregation function, a link selection strategy via the kernel layer, and establishing a mapping relation between data streams and wireless links according to the link selection strategy to transmit data stream on a designated link; and
    determining, according to a transmission rate of the first wireless link and a transmission rate of each of the at least one second wireless link, the link selection strategy via the kernel layer comprising:
        obtaining a first peak transmission rate of the first wireless link and a first peak transmission rate of each of the at least one second wireless link at a current time point via the kernel layer;
        determining, according to the first peak transmission rate of the first wireless link, a data stream allocation weight for the first wireless link via the kernel layer, and determining, according to the first peak transmission rate of each of the at least one second wireless link, a data stream allocation weight for each of the at least one second wireless link via the kernel layer; and
        determining, according to the data stream allocation weight for the first wireless link and the data stream allocation weight for each of the at least one second wireless link, the link selection strategy via the kernel layer.

2. The method of claim 1, wherein enabling the link aggregation function via the framework layer comprises:
    transmitting link aggregation information to the kernel layer via the framework layer, the link aggregation information being used for enabling the link aggregation function; and
    enabling, according to the link aggregation information, the link aggregation function via the kernel layer.

3. The method of claim 2, wherein the link aggregation information comprises at least one of: a score of network quality of the first wireless link, status of a screen of the electronic device, or a white list recording applications allowed to use the link aggregation function.

4. The method of claim 3, further comprising:
    enabling, in response to a condition, the link aggregation function via the kernel layer, wherein the condition is at least one of the following: the score of the network quality of the first wireless link exceeds a threshold, the status of the screen of the electronic device is a screen-on status, or an application running in a foreground of the electronic device is recorded in the white list.

5. The method of claim 1, wherein obtaining the first peak transmission rate of the first wireless link and the first peak transmission rate of each of the at least one second wireless link at the current time point via the kernel layer comprises:
    determining a data increment rate of the first wireless link and a data increment rate of each of the at least one second wireless link at the current time point via the kernel layer;
    obtaining a second peak transmission rate of the first wireless link and a second peak transmission rate of each of the at least one second wireless link at a time point earlier than the current time point via the kernel layer;

determining a first round-trip time (RTT) of the first wireless link and a first RTT of each of the at least one second wireless link at the current time point via the kernel layer;

determining, according to the data increment rate of the first wireless link, the second peak transmission rate of the first wireless link, and the first RTT of the first wireless link, the first peak transmission rate of the first wireless link at the current time point via the kernel layer; and determining, according to the data increment rate of each of the at least one second wireless link, the second peak transmission rate of each of the at least one second wireless link, and the first RTT of each of the at least one second wireless link, the first peak transmission rate of each of the at least one second wireless link at the current time point via the kernel layer.

6. The method of claim 5, wherein determining the data increment rate of the first wireless link and the data increment rate of each of the at least one second wireless link at the current time point via the kernel layer comprises:

obtaining a first data amount of the first wireless link and a first data amount of each of the at least one second wireless link at a first time point via the kernel layer, wherein the first time point is the current time point;

obtaining a second data amount of the first wireless link and a second data amount of each of the at least one second wireless link at a second time point via the kernel layer, wherein the second time point is earlier than the first time point;

determining, according to the first data amount of the first wireless link and the second data amount of the first wireless link, the data increment rate of the first wireless link at the current time point via the kernel layer; and determining, according to the first data amount of each of the at least one second wireless link and the second data amount of each of the at least one second wireless link, the data increment rate of each of the at least one second wireless link at the current time point via the kernel layer.

7. The method of claim 1, further comprising:

obtaining, in response to a target data package to be transmitted, a link identifier in the target data package via the kernel layer;

determining a target wireless link corresponding to the link identifier in the target data package via the kernel layer, the target wireless link being one of the first wireless link and the at least one second wireless link; and transmitting the target data package on the target wireless link via the kernel layer.

8. The method of claim 7, further comprising:

determining, in response to determining that the target data package is in cache status, via, a target data stream corresponding to the target data package via the kernel layer, and determining the target wireless link corresponding to the target data stream via the kernel layer; and querying a routing table via the kernel layer to add the link identifier of the target wireless link to the target data package.

9. The method of claim 1, wherein the operation interface is one of: a lock interface, a system desktop, a main interface for setting, a network setting interface, or an interface of a target application.

10. The method of claim 1, where the touch operation is one of: a touch operation on a link aggregation switch of the operation interface or a touch operation on a designated position of the operation interface.

11. An electronic device comprising:
an application layer;
a framework layer;
a kernel layer;
a processor; and
a memory, configured to store one or more programs, the one or more programs, when executed, being operable with the processor to:

detect a touch operation on an operation interface via the application layer;

enable, in response to the touch operation, a link aggregation function via the framework layer, the link aggregation function being enabled by establishing a first wireless link and at least one second wireless link;

determine, in response to enablement of the link aggregation function a link selection strategy via the kernel layer, and establish a mapping relation between data streams and wireless links according to the link selection strategy to transmit data stream on a designated link; and determine, according to a transmission rate of the first wireless link and a transmission rate of each of the at least one second wireless link, the link selection strategy via the kernel layer comprising:

obtain a first peak transmission rate of the first wireless link and a first peak transmission rate of each of the at least one second wireless link at a current time point via the kernel layer;

determine, according to the first peak transmission rate of the first wireless link, a data stream allocation weight for the first wireless link via the kernel layer, and determine, according to the first peak transmission rate of each of the at least one second wireless link, a data stream allocation weight for each of the at least one second wireless link via the kernel layer; and determine, according to the data stream allocation weight for the first wireless link and the data stream allocation weight for each of the at least one second wireless link, the link selection strategy via the kernel layer.

12. The electronic device of claim 11, wherein the one or more programs operable with the processor to enable the link aggregation function via the framework layer are operable with the processor to:

transmit link aggregation information to the kernel layer via the framework layer, wherein the link aggregation information is used for enabling the link aggregation function; and enable, according to the link aggregation information, the link aggregation function via the kernel layer.

13. The electronic device of claim 12, wherein the link aggregation information comprises at least one of: a score of network quality of the first wireless link, status of a screen of the electronic device, or a white list recording applications allowed to use the link aggregation function.

14. The electronic device of claim 11, wherein the one or more programs are further operable with the processor to:

obtain, in response to a target data package to be transmitted, a link identifier in the target data package via the kernel layer;

determine a target wireless link corresponding to the link identifier in the target data package via the kernel layer, wherein the target wireless link is one of the first wireless link and the at least one second wireless link; and transmit the target data package on the target wireless link via the kernel layer.

15. The electronic device of claim 14, wherein the one or more programs are further operable with the processor to:

determine, in response to determining that the target data package is in cache status, a target data stream corresponding to the target data package via the kernel layer, and determine the target wireless link corresponding to the target data stream via the kernel layer; and query a routing table via the kernel layer to add the link identifier of the target wireless link to the target data package.

16. An electronic device comprising:

a processor; and a memory, configured to store one or more programs, the one or more programs, when executed, being operable with the processor to:

enable, in response to an operation for enabling a link aggregation function, the link aggregation function to establish at least two different wireless links;

determine a correspondence between data streams and wireless links, the wireless links comprising the at least two different wireless links;

determine a target data stream corresponding to a target data package to be transmitted;

determine a target wireless link according to the target data stream and the correspondence, the target wireless link being one of the at least two different wireless links;

transmit the target data package on the target wireless link;

obtain, in response to a target data package to be transmitted, a link identifier in the target data package via the kernel layer;

determine a target wireless link corresponding to the link identifier in the target data package via the kernel layer, wherein the target wireless link is one of the first wireless link and the at least one second wireless link;

transmit the target data package on the target wireless link via the kernel layer;

determine, in response to determining that the target data package is in cache status, a target data stream corresponding to the target data package via the kernel layer, and determine the target wireless link corresponding to the target data stream via the kernel layer; and query a routing table via the kernel layer to add the link identifier of the target wireless link to the target data package.

* * * * *